(12) United States Patent
Cocuzza et al.

(10) Patent No.: US 9,021,401 B2
(45) Date of Patent: Apr. 28, 2015

(54) METHODS AND SYSTEMS INVOLVING BROWSER NODES

(75) Inventors: Anthony M. Cocuzza, Poughkeepsie, NY (US); Shayne Grant, Research Triangle Park, NC (US); Pu Liu, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1107 days.

(21) Appl. No.: 12/563,322

(22) Filed: Sep. 21, 2009

(65) Prior Publication Data

US 2011/0072398 A1    Mar. 24, 2011

(51) Int. Cl.
G06F 3/048    (2013.01)
G06F 7/00    (2006.01)
G06F 17/30    (2006.01)

(52) U.S. Cl.
CPC .... *G06F 17/30861* (2013.01); *G06F 17/30958* (2013.01)

(58) Field of Classification Search
CPC .......................... G06F 17/30958; G06F 3/0481
USPC ........ 707/800, 815; 715/853–855; 711/3, 100
See application file for complete search history.

(56) References Cited

U.S. PATENT DOCUMENTS

| | | | | |
|---|---|---|---|---|
| 5,319,778 A * | 6/1994 | Catino | ................................. | 1/1 |
| 5,926,180 A * | 7/1999 | Shimamura | ................... | 715/739 |
| 6,003,037 A * | 12/1999 | Kassabgi et al. | ....................... | 1/1 |
| 6,012,067 A * | 1/2000 | Sarkar | .................... | 1/1 |
| 6,094,663 A * | 7/2000 | Snow et al. | .................... | 707/799 |
| 6,211,877 B1 | 4/2001 | Steele et al. | | |
| 6,292,792 B1 * | 9/2001 | Baffes et al. | .................... | 706/45 |
| 6,523,022 B1 * | 2/2003 | Hobbs | .................... | 1/1 |
| 7,174,286 B2 * | 2/2007 | Martin et al. | .................. | 703/22 |
| 7,370,054 B1 * | 5/2008 | Martin et al. | ................. | 707/747 |
| 7,426,699 B2 | 9/2008 | Schneider | | |
| 7,624,173 B2 * | 11/2009 | Bary et al. | ..................... | 709/224 |
| 2003/0187995 A1 * | 10/2003 | Fok et al. | ...................... | 709/227 |
| 2004/0044861 A1 * | 3/2004 | Cavallo et al. | ................ | 711/160 |
| 2005/0246444 A1 * | 11/2005 | Koehane et al. | ............. | 709/227 |
| 2007/0192671 A1 * | 8/2007 | Rufener | ....................... | 715/500 |
| 2008/0063003 A1 * | 3/2008 | O'Neal | ........................ | 370/408 |
| 2008/0184158 A1 * | 7/2008 | Selig | ............................. | 715/781 |
| 2008/0301562 A1 * | 12/2008 | Berger et al. | ................. | 715/733 |
| 2009/0024953 A1 * | 1/2009 | Selig | ............................. | 715/781 |
| 2009/0100438 A1 * | 4/2009 | Hinton et al. | ................. | 719/311 |
| 2010/0031153 A1 * | 2/2010 | Ortwein et al. | ............... | 715/733 |

* cited by examiner

*Primary Examiner* — Tadeese Hailu

(74) *Attorney, Agent, or Firm* — Cantor Colburn LLP; William A. Kinnaman, Jr.

(57) ABSTRACT

A method comprises creating a first node, determining whether an indicator associated with a head node is present, and designating the first node as a head node, defining and associating a head node identifier with the first node, define a link from the first node to the first node, and create and save an indicator associated with the head node responsive to determining that the indicator associated with a head node is not present.

13 Claims, 5 Drawing Sheets

METHODS AND SYSTEMS INVOLVING BROWSER NODES

BACKGROUND

The present invention relates to browser nodes, and more specifically, to interconnectivity between browser windows and tabs in browser windows.

Accessing data networks such as the Internet with browsers has become more complex. Many browsers include tab or multiple window features that allow a user to simultaneously access and send data using numerous tabs or windows.

BRIEF SUMMARY

According to one embodiment of the present invention, a method comprises creating a first node, determining whether an indicator associated with a head node is present, and designating the first node as a head node, defining and associating a head node identifier with the first node, define a link from the first node to the first node, and create and save an indicator associated with the head node responsive to determining that the cookie associated with a head node is not present.

According to another embodiment of the present invention, a method comprises determining whether a first node has received event data from a second node, identifying a node linked to the first node in a linked list table in a memory, sending the event data from the first node to the identified node linked to the first node responsive to receiving the event data from a second node.

According to yet another embodiment of the present invention, a method comprises closing a first node, removing the first node from a linked list table, determining whether the closed node is a head node, determining whether the head node is the last sequential node in the linked list table responsive to determining that the closed node is the head node, and designating a second node as the head node responsive to determining that the closed node is not the head node.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In previous systems, the nodes in a browser lacked synchronization features. For example, actions taken in a node X were independent from actions taken in node Y. If node X and node Y are tabs in a browser, and were opened to interact in an email website, a user may take actions in tab X such as, deleting an email that would not be reflected in node Y unless a server was notified that the emails were deleted, realized the relationship between the nodes X and Y, and pushed the updated action data to the Y node.

Figure 1:
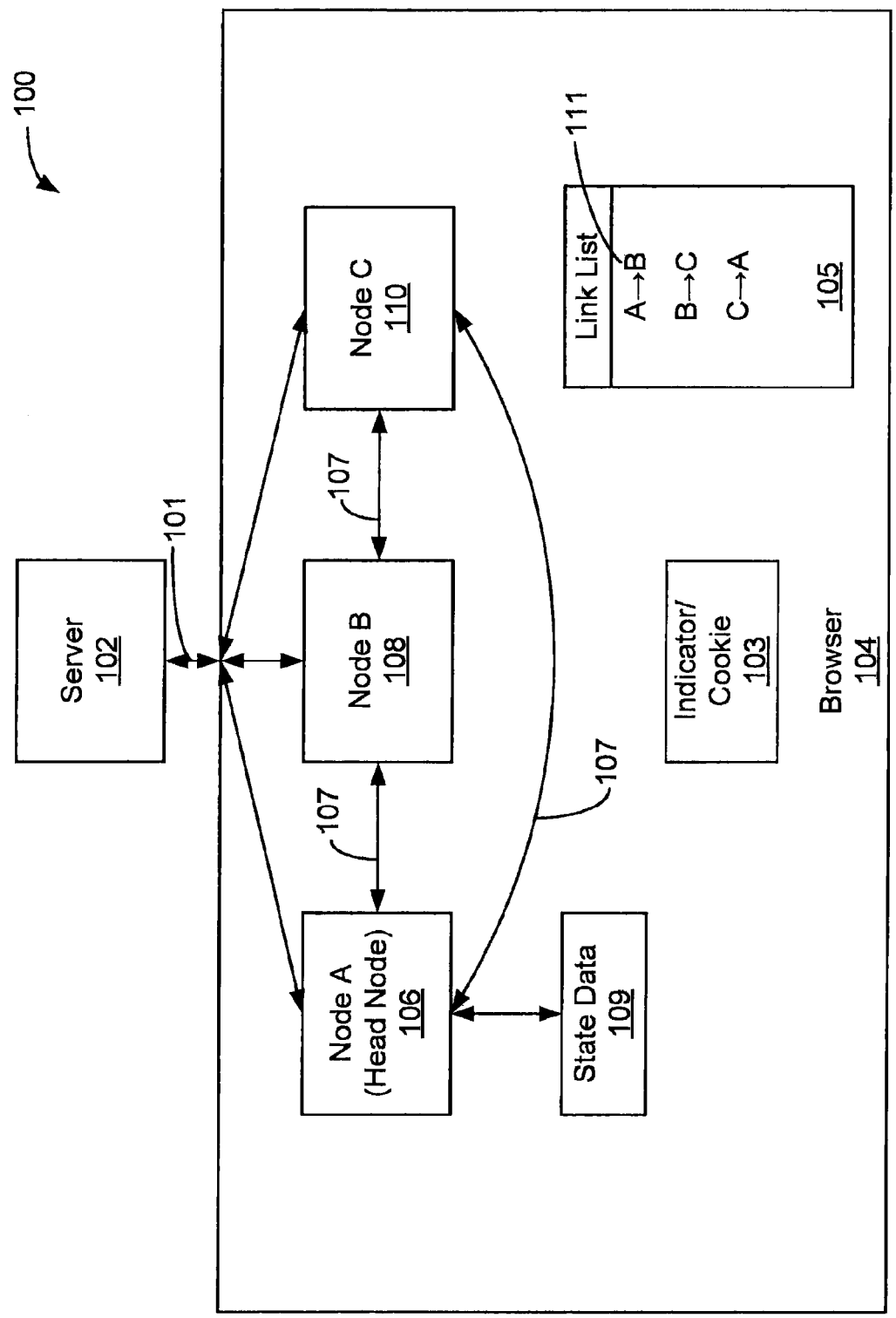
FIG. 1 is a block diagram of an exemplary embodiment of a system.

FIG. 1 is a block diagram of an exemplary embodiment of a system 100. The system 100 includes a server 102, a browser 104, and browser node A 106, browser node B 108, and browser node C 110 (nodes A, B, and C respectively). The nodes represent, for example, browser windows or browser tabs. The browser 104 is communicatively connected to the server 102 via a network connection 101, such as, for example, a local area network, or the Internet. The nodes are communicatively connected via links 107 that represent data flow paths, and may also communicate with the server 102. The browser 104 may include an indicator such as, for example, a cookie 103 and a linked list table 105. The linked list table 105 may be stored in a structured memory location that is maintained by the browser 104. The linked list table 105 may also be stored in a database (described below). The linked list table 105 includes link entries 111 that each identify a link between nodes represented by the arrows 107. The links may be, for example, pointers from one node to another node that define the data flow paths and may be, for example, links in a circular data flow path.

Figure 2:
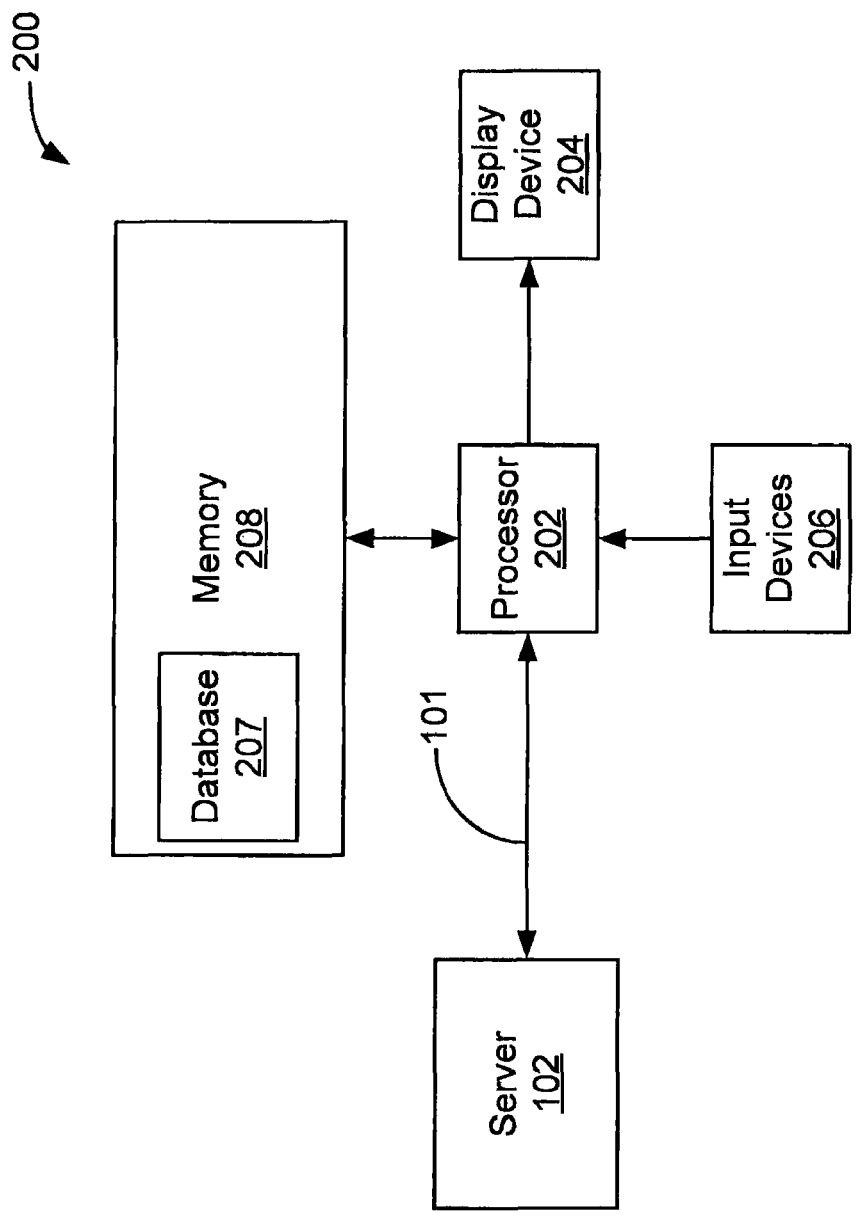
FIG. 2 is a block diagram of an exemplary embodiment of a computer system.

FIG. 2 is a block diagram of an exemplary embodiment of a computer system 200 that is operative to execute the functions of the browser 104 communicating with the server 102. The system 200 includes a processor 202, a display device 204, input devices 206, and a memory 208 that may include a database 207. The browser 104, nodes 106-110, cookie 103, and linked list 105 may represent software modules that may be executed and displayed by a user with the system 200.

Figure 3:
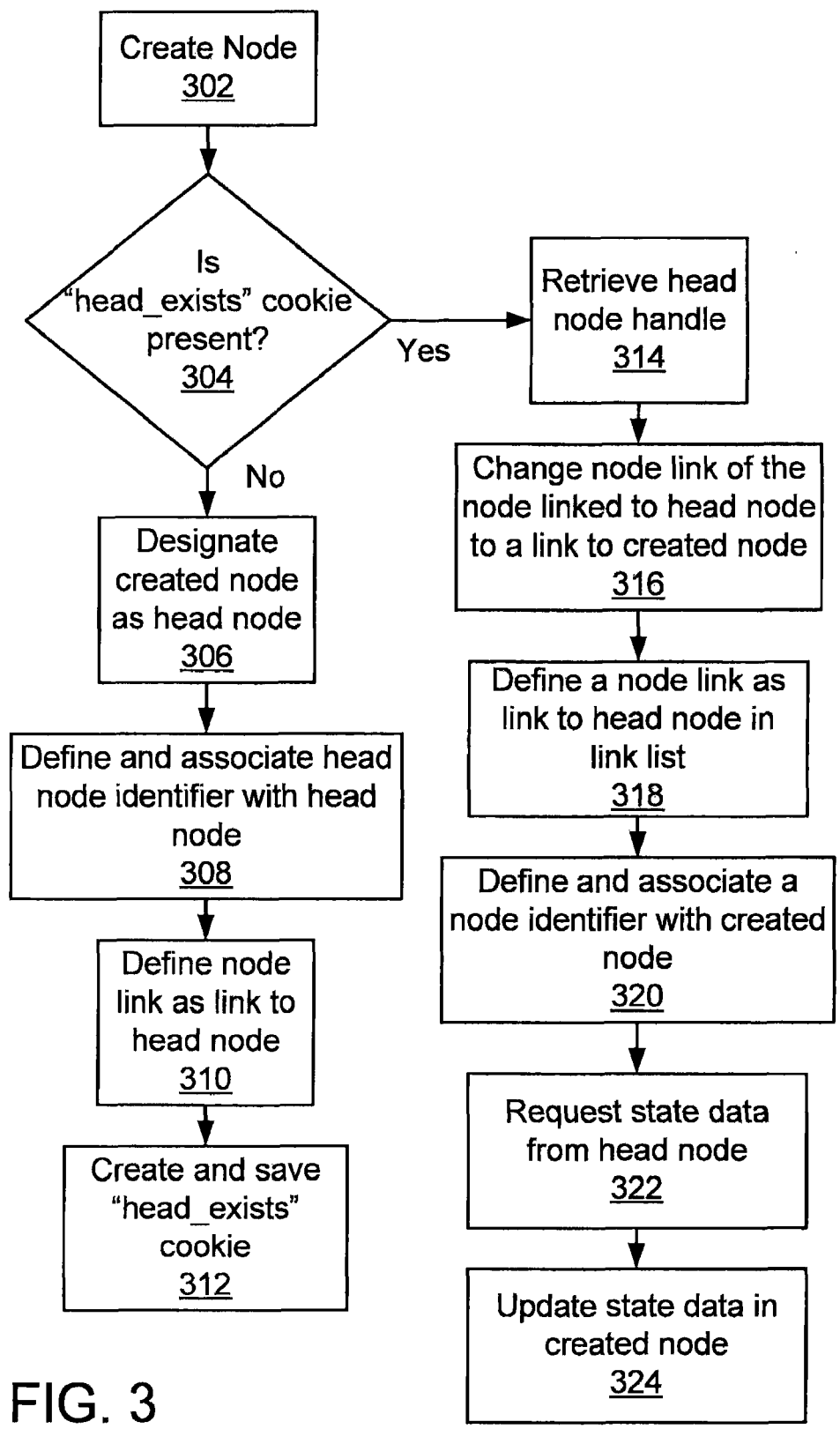
FIGS. 3-5 are block diagrams of exemplary methods of operating the system of FIG. 1.

FIG. 3 is a block diagram of an exemplary method for creating and connecting nodes in the browser 104. The method may be executed in, for example JavaScript code, or any other programming language. In this regard, in block 302 a node is created. A node may be created by for example, JavaScript code, Hypertext Markup Language (HTML), or from a command in the browser window executed by a user. Once the node is created an onload( ) event is triggered that determines whether an indicator "head_exists" is present in the browser in block 304. If no, the created node is designated as the head node in block 306. In block 308 an identifier is defined and associated with the head node, by for example, changing the window name of the node. In block 310, a link is defined that links the head node to the head node. The link is saved in the linked list table 105 (of FIG. 1). A "head_exists" cookie is created and stored in block 312. Alternate embodiments may include another indicator that indicates that a head node exists such as, for example, a flag bit in an associated file, or state data. Referring to block 314, if the "head_exists" cookie is present, the head node handle is retrieved by the created node. In block 316, the node link entry of the node linked to the head node is changed to link to the created node. A created link entry is defined and saved to the linked list table 105 that links the created node to the head node in block 318. In block 320 an identifier of the created node is defined and associated with the created node. In block 322, the created node requests state data from the head node. The state data is updated in the created node in block 324.

Figure 4:
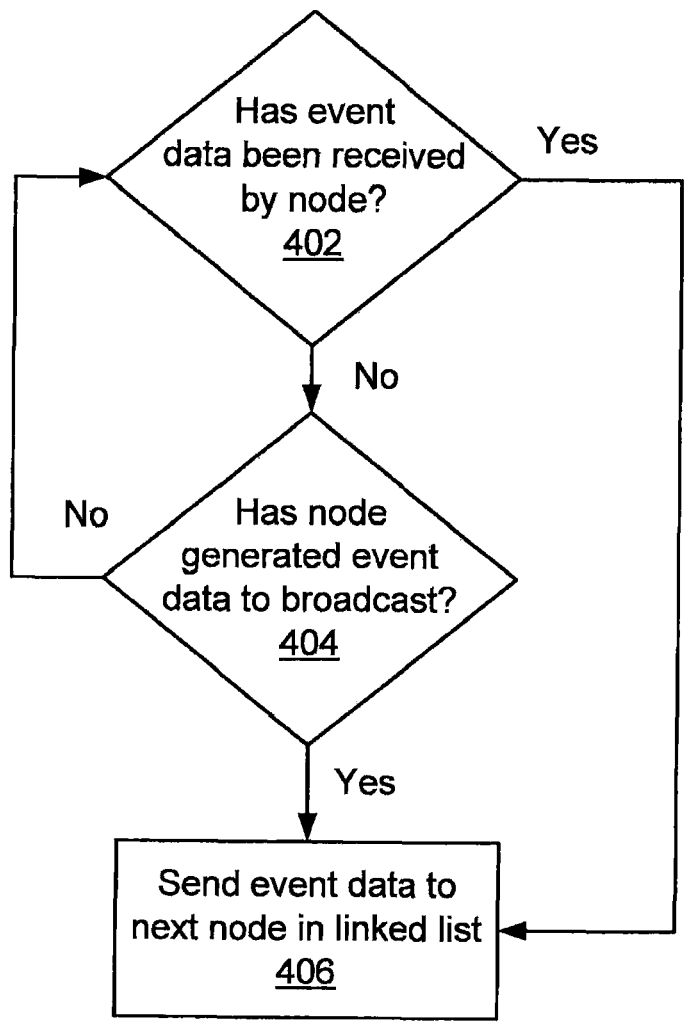

FIG. 4 is a block diagram of an exemplary method for sending data between nodes. In block 402 a node determines whether event data has been received from, for example, another node, or the server 102 (of FIG. 1). If yes, the node checks the linked list 105 to determine which node the node is linked to, and sends the data to the linked node in block 406. If no, the node determines whether the node has any event data to send, such as, for example, event data generated by the node that should be broadcast to the other nodes, in block 404. If yes, the event data is sent in block 406.

Figure 5:
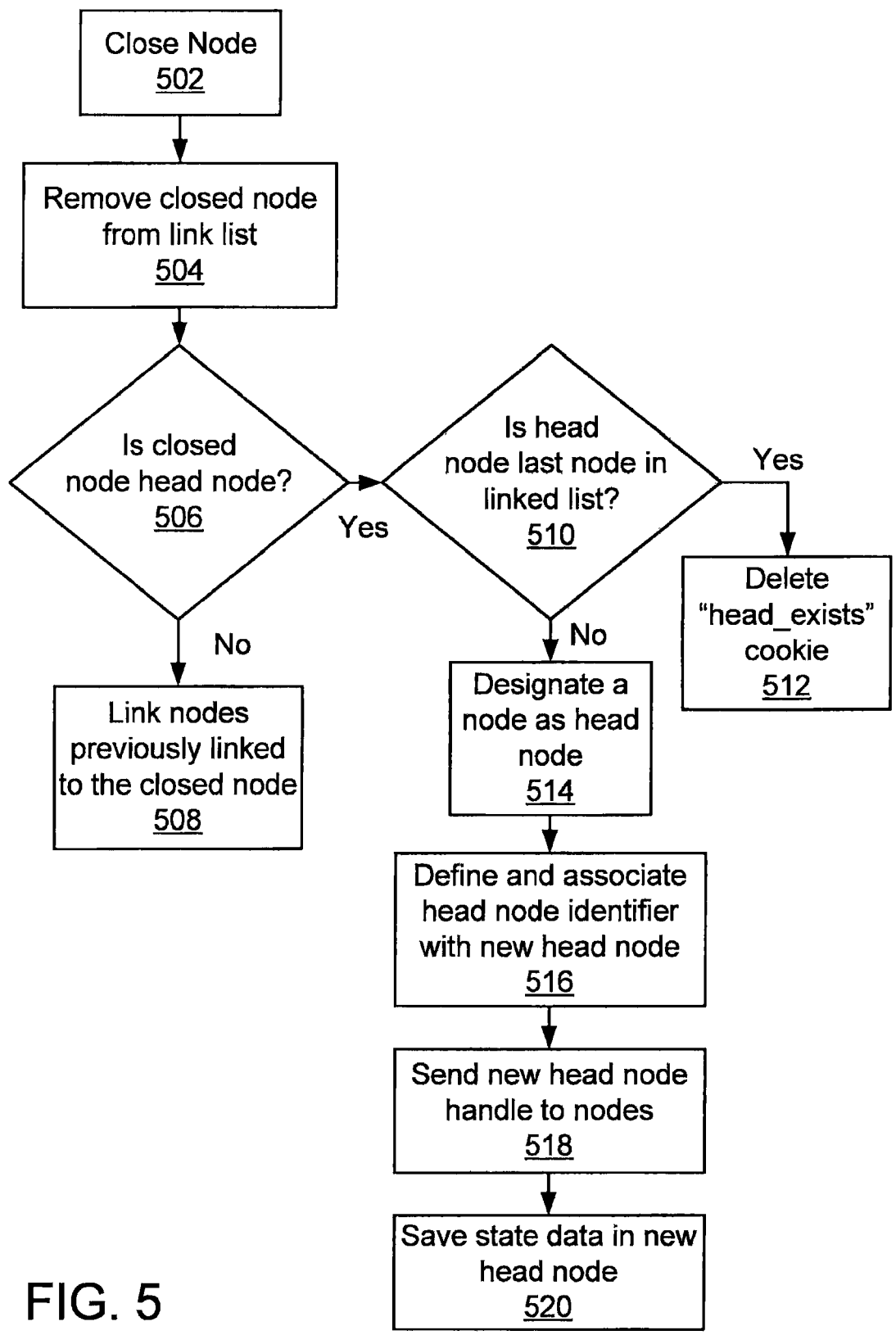

FIG. 5 is a block diagram of an exemplary method for closing a node. In block 502 a node is closed. The closed node is removed from the linked list table 105 in block 504. In block 506, the node determines whether the closed node is a head node. If no, the nodes previously linked to the closed node are linked by changing the link entries in the linked list table 105. For example if node A is linked to node B and node B is linked to node C, and node B is closed, node A will be linked to node C. If yes, in block 510 the node determines whether the head node is the last remaining node in the linked list table 105. If yes, the "head_exists" cookie is deleted in block 512. If no, another node is designated as the head node in block 514. In block 516, a head node identifier is defined and associated with the new head node. A new head node handle is sent to the nodes in block 518. In block 520 state data is stored in the new head node.

Example embodiments of the present invention may be implemented, in software, for example, as any suitable computer program. For example, a program in accordance with one or more example embodiments of the present invention may be a computer program product causing a computer to execute one or more of the example methods described herein: a method for simulating arbitrary software and/or unmodified code directly on a host processor.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer, where instructions or functions may be executed for simulating arbitrary software and/or unmodified code directly on a host processor, in accordance with example embodiments of the present invention.

Further, such programs, when recorded on computer-readable storage media, may be readily stored and distributed. The storage medium, as it is read by a computer, may enable the simulation of arbitrary software and/or unmodified code directly on a host processor, in accordance with the example embodiments of the present invention.

Example embodiments of the present invention being thus described, it will be obvious that the same may be varied in many ways. For example, the methods according to example embodiments of the present invention may be implemented in hardware and/or software. The hardware/software implementations may include a combination of processor(s) and article(s) of manufacture. The article(s) of manufacture may further include storage media and executable computer program(s), for example, a computer program product stored on a computer readable medium.

Although example embodiments of the present invention have been discussed herein with regard to specific applications and/or implementations, it will be understood that example embodiments may be utilized in, for example, in firm ASIC chip design or implemented in traditional circuitry.

Although example embodiments of the present invention have been shown and described with regard to certain operations being performed serially or consecutively, it will be understood that any combination of these operations may be performed simultaneously and in parallel.

Although specific aspects may be associated with specific example embodiments of the present invention, as described herein, it will be understood that the aspects of the example embodiments, as described herein, may be combined in any suitable manner.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
creating a first node with a processor;
determining whether an indicator associated with a head node is present; and
designating the first node as a head node by defining and associating a head node identifier with the first node, defining a link from the first node to the first node, wherein the link defines a data flow path from the first node to the first node, and creating and saving, in a memory device, an indicator associated with the head node responsive to determining that the indicator associated with a head node is not present, wherein the link from the first node to the first node is saved in a linked list table of a memory, wherein the linked list table includes the link that defines the data flow path from the first node to the first node.

2. The method of claim 1, wherein the method further comprises responsive to determining that the indicator associated with a head node is present:
retrieving a handle of the head node, changing a link of a node linked to the head node to link to the first node, defining a link from the first node to the head node, and defining and saving an identifier of the first node.

3. The method of claim 2, wherein the method further comprises:
requesting state data from the head node; and
updating state data in the first node.

4. The method of claim 1, wherein the first node is a browser window.

5. The method of claim 1, wherein the indicator is a cookie.

6. The method of claim 1, wherein the link from the first node to the first node is a pointer operative to define the data flow path.

7. A computer program product for linking nodes in a browser, the computer program product comprising a storage medium readable by a processing circuit and storing instructions for execution by the processing circuit for implementing the method of claim 1.

8. A method comprising:
closing a first node with a processor;
removing the first node from a linked list table stored in a memory device;
determining whether the closed node is a head node;
determining whether the head node is the last sequential node in the linked list table responsive to determining that the closed node is the head node; and
designating a second node as the head node responsive to determining that the closed node is the head node;
defining and associating a head node identifier with the second node responsive to determining that the closed node is the head node and that the head node is not the last sequential node in the linked list table, the defining including defining a link from the second node to the second node, the link defining a data flow path from the first node to the first node, wherein the linked list table includes the link that defines the data flow path from the second node to the second node.

9. The method of claim 8, wherein the method further comprises:
identifying a second node linked to the first node in the linked list table; and
changing a link associated with the second node to link the second node to a next sequential node in the linked list table responsive to determining that the closed node is not the head node.

10. The method of claim 8, wherein the method further comprises deleting an indicator associated with the head node responsive to determining that the closed node is the head node and that the head node is not the last sequential node in the linked list table.

11. The method of claim 10, wherein the method further comprises sending a handle of the second node to linked nodes.

12. The method of claim 11, wherein the method further comprises saving state data in the second node.

13. A computer program product for linking nodes in a browser, the computer program product comprising a storage medium readable by a processing circuit and storing instructions for execution by the processing circuit for implementing the method of claim 8.

* * * * *